United States Patent
Kosnicki et al.

(10) Patent No.: US 12,508,283 B2
(45) Date of Patent: Dec. 30, 2025

(54) PERSONALIZED SKIN CARE COMPOSITIONS

(71) Applicant: Kimberly-Clark Worldwide, Inc., Neenah, WI (US)

(72) Inventors: Kassi Kosnicki, La Mesa, CA (US); Kathleen C. Engelbrecht, Kaukauna, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 315 days.

(21) Appl. No.: 18/547,601

(22) PCT Filed: Mar. 31, 2021

(86) PCT No.: PCT/US2021/025058
§ 371 (c)(1),
(2) Date: Aug. 23, 2023

(87) PCT Pub. No.: WO2022/211798
PCT Pub. Date: Oct. 6, 2022

(65) Prior Publication Data
US 2024/0226169 A1    Jul. 11, 2024

(51) Int. Cl.
*A61K 8/98*  (2006.01)
*A61K 9/00*  (2006.01)
*A61K 35/20* (2006.01)
*A61K 35/36* (2015.01)
*A61Q 19/00* (2006.01)

(52) U.S. Cl.
CPC .............. *A61K 35/20* (2013.01); *A61K 8/985* (2013.01); *A61K 8/986* (2013.01); *A61K 9/0014* (2013.01); *A61K 35/36* (2013.01); *A61Q 19/00* (2013.01); *A61K 2800/591* (2013.01); *A61K 2800/805* (2013.01); *A61K 2800/85* (2013.01); *A61K 2800/882* (2013.01)

(58) Field of Classification Search
CPC ....................................................... A61K 8/98
See application file for complete search history.

(56) References Cited

U.S. PATENT DOCUMENTS

| | | |
|---|---|---|
| 6,756,032 B1 | 6/2004 | Tepper et al. |
| 7,507,402 B1 | 3/2009 | Farmer et al. |
| 9,492,337 B2 | 11/2016 | Ehrnsperger et al. |
| 9,717,270 B2 | 8/2017 | Ludwig et al. |
| 2011/0224637 A1 | 9/2011 | Edgett et al. |
| 2013/0281948 A1 | 10/2013 | Ehrnsperger et al. |
| 2019/0175417 A1 | 6/2019 | Graham |

FOREIGN PATENT DOCUMENTS

| | | | |
|---|---|---|---|
| CN | 104164379 A | * | 11/2014 |
| CN | 107550808 A | | 1/2018 |
| EP | 1032434 B1 | | 3/2003 |
| KR | 101561002 B1 | | 10/2015 |

OTHER PUBLICATIONS

International Search Report and Written Opinion for PCT Patent Application PCT/US2021/025058 mailed Dec. 23, 2021; 10 pp.
Seifi, Bahar et al., "Assessment effect of breast milk on diaper dermatitis," Dermatology Reports 2017; vol. 9:7044; 4 pp.
Teufel, Amber et al., "Characterization of the microbiome in the infant diapered area: Insights from healthy and damaged skin," Experimental Dermatology 2021; vol. 30, pp. 1409-1417.
Witkowska-Zimny, Malgorzata et al., "Milk Therapy: Unexpected Uses for Human Breast Milk," Nutrients 2019; vol. 11, No. 944; doi:10.3390/nu11050944; 12 pp.
Williams, Janet E. et al.,"Strong Multivariate Relations Exist Among Milk, Oral, and Fecal Microbiomes in Mother-Infant Dyads During the First Six Months Postpartum," The Journal of Nutrition, vol. 149, Issue 6, Jun. 2019; https://doi.org/10.1093/jn/nxy299; pp. 902-914.
Ferretti, Pamela et al., "Mother-to-Infant Microbial Transmission from Different Body Sites Shapes the Developing Infant Gut Microbiome," Cell Host & Microbe, Jul. 11, 2018, vol. 24, https://doi.org/10.1016/j.chom.2018.06.005; pp. 133-145.
Kordy, Kattayoun et al., "Contributions to human breast milk microbiome and enteromammary transfer of Bifidobacterium breve," PLOS One, Jan. 28, 2020; https://doi.org/10.1371/journal.pone.0219633; 10 pp.
Gaitanis, Georgios MD, Ph.D. et al., "Variation of cultured skin microbiota in mothers and their infants during the first year postpartum," Pediatric Dermatology, vol. 36, No. 4, Apr. 25, 2019; https://doi.org/10.1111/ode.13829; pp. 460-465.
Mutic, Abby D., MSN, CNM, et al., "The Postpartum Maternal and Newborn Microbiomes," MCN Am J Child Nurs., vol. 42, No. 6; doi:10.1097/NMC.000000000000374; 11 pp.
Witkowska-Zimny, Malgorzata et al., "Cells of human breast milk," Cellular & Molecular Biology Letters, 2017, 22:11; DOI 10.1186/s11658-017-0042-4; 11 pp.
Williams, Timberly Ann, "A DNA-based Investigation of Intestinal Microbiota of Infants and the Impact of Prebiotics and Maternal Intestinal Microbiota," OhioLINK; 216 pp.
Zheng, Yumei et al., "Shifts in the skin microbiome associated with diaper dermatitis and emollient treatment amongst infants and toddlers in China," Experimental Dermatology, 2019; vol. 28, pp. 1289-1297.

\* cited by examiner

*Primary Examiner* — Qiuwen Mi
(74) *Attorney, Agent, or Firm* — Armstrong Teasdale LLP (57) ABSTRACT

Described herein are personalized skin care compositions including a cultured composition including a milk sample and a skin sample. and optionally an additive. Also described herein are kits and methods for making personalized skin care compositions. Also described herein are methods of treating or preventing skin conditions using personalized skin care compositions.

20 Claims, 1 Drawing Sheet

PERSONALIZED SKIN CARE COMPOSITIONS

CROSS-REFERENCE TO RELATED APPLICATION

This application is a U.S. National Phase Application of PCT/US2021/025058, filed Mar. 31, 2021, the content of which is hereby incorporated by reference in its entirety.

FIELD OF DISCLOSURE

This disclosure is directed to personalized skin care compositions, kits and methods for making personalized skin care compositions, and methods of treating or preventing skin conditions using personalized skin care compositions.

BACKGROUND

Diapering practices vary across the globe as a result of cultural standards, family practices, and income. However, as different as these practices are, disposable diapers continue to be the most commonly used as they are associated with maintaining better hygiene and skin health. Unfortunately, use of disposable diapers alone has not been able to eliminate the occurrence of diaper rash in infants. For this reason, there is a need for innovations that help mitigate and solve diaper rash in infants.

Diaper rash has been attributed to a number of different factors in the diapered environment such as stratum corneum over hydration, friction damage, reduced natural moisturization factor (NMF), and exposure to irritants contained in urine, feces, and extrinsic chemicals. However, the diapered skin is comprised of a very diverse microbiota made up of endemic and transient (GI tract) microbes. When skin health is compromised, skin microbiota shifts have been observed as is the case in atopic dermatitis. However, it is unclear whether the state of the skin microbiome has any relationship with the occurrence of diaper rash. Previous studies have indicated increases in health-associated bacteria such as *Faecalibacterium prausnitzii, Bacteroides caccai, Bacteroides fragilis, Bacteroides stercoris, Bacteroides xylanisolvens, Parabacteroides distansonis,* and *Prevotella copri* in the post-diaper rash recovered state and decreases in disease-associated bacteria, such as *Finegoldia magna, Anaerococcus vaginalis,* and *Campylobacter ureolyticus.*

Common practices for reducing diaper rash in infants involve increasing the frequency of diaper changes, applying topical agents, and removing the diaper for an extended period to reduce occlusion on the skin. More recently, probiotics administered through infant formula or in topical agents to the diapered region have been used as a way to promote microbial health both in the gut and on the skin. Probiotics administered orally are often created to mimic the microbial composition of breast milk as breast milk is shown to seed the infant's gut microbiome with "good" bacteria. Additionally, nurses and caretakers have used mother's breast milk, topically, to mitigate infant's diaper rash as the effectiveness has been compared to that of common barrier creams.

Though effective, administration of probiotics and mother's breast milk in diaper rash treatment fail to address the complexities of microbial variation from person to person, over time and during maturation, and in response to external factors such as antibiotics.

Previous studies indicate that diet (breast milk versus formula feeding) can play a large role in intestinal microbiota composition. The human milk oligosaccharides (HMOs) and beneficial microbes found in breast milk may promote the colonization of intestinal microbes in the newborn or infant gastrointestinal tract. Accordingly, each breastfeeding mother and breastfed infant is uniquely paired by the relationship between their respective breast milk and intestinal microbiomes. This relationship is dynamic, as the breast milk microbiome changes over time to accommodate the different needs of the growing infant. In addition, the colonization of intestinal microbes promoted by breast milk includes microbes that are increased on the diapered skin of non-rash infants. Since both endemic skin and transient intestinal microbes reside on the infant diapered skin, personalized skin care compositions that are able to maintain the infant skin microbiome observed during non-rash durations, thereby mitigating diaper rash, are needed.

It was surprisingly found in the present disclosure that a personalized skin care composition using paired mother-infant microbiome samples can be used to mitigate or eliminate diaper rash. These methods maintain a personalized healthy diapered skin microbiome specific to each infant, rather than using a generalized approach as is seen when routinely administering oral probiotics. There is an unmet need for personalized skin care compositions for diaper rash and other skin conditions.

Described herein are personalized skin care compositions and kits and methods for making the same. Methods of treating or preventing skin conditions are also described.

OBJECTIVE OF THE DISCLOSURE

The aim of the present disclosure is to provide personalized skin care compositions and kits and methods for making personalized skin care compositions. The personalized skin care compositions are useful for treating or preventing skin conditions.

BRIEF DESCRIPTION OF THE DISCLOSURE

In one aspect, provided herein is a personalized skin care composition comprising a cultured composition comprising a milk sample acquired from breast milk or baby formula and a skin sample acquired from a healthy skin area of a subject, and optionally an additive.

In another aspect, provided herein is a kit for making a personalized skin care composition, the kit comprising a sterile implement, a sterile collection vial, a sterile, hydrophobic container comprising etching for biofilm formation, a lid, and a filter allowing for gas exchange, optionally a breast pump, and written instructions for making the personalized skin care composition, comprising the method steps of (i) acquiring a milk sample from breast milk or baby formula using the sterile collection vial and optionally the breast pump, (ii) acquiring a skin sample from a healthy skin area of a subject using the sterile implement, (iii) transferring the milk sample to the sterile, hydrophobic container and mixing the milk sample and the skin sample, and (iv) culturing the milk sample and the skin sample to yield the personalized skin care composition.

In another aspect, provided herein is a method of making a personalized skin care composition, the method comprising (i) acquiring a milk sample from breast milk or baby formula, (ii) acquiring a skin sample from a healthy skin area of a subject, (iii) mixing the milk sample and the skin sample, and (iv) culturing the milk sample and the skin sample to yield the personalized skin care composition.

In yet another aspect, provided herein is a method of treating or preventing a skin condition in a skin area in need thereof, the method comprising (i) acquiring a milk sample from breast milk or baby formula, (ii) acquiring a skin sample from a healthy skin area of a subject, (iii) mixing the milk sample with the skin sample, (iv) culturing the milk sample and skin sample to yield a personalized skin care composition, and (v) applying an effective amount of the personalized skin care composition to the skin area in need thereof of the subject.

DETAILED DESCRIPTION OF THE DISCLOSURE

The present disclosure generally relates to personalized skin care compositions comprising a cultured milk sample and skin sample, and optionally an additive. In particular, the present disclosure relates to personalized skin care compositions comprising a cultured milk sample from the breast milk of a human mother and a skin sample from a breastfed child of the mother. Also described herein are kits and methods for making the personalized skin care compositions, as well as methods of treating or preventing skin conditions using the personalized skin care compositions. The personalized skin care compositions described herein are particularly useful for treating or preventing diaper rash.

Compositions

Generally, the personalized skin care compositions in accordance with the present disclosure comprise a cultured composition comprising a milk sample and a skin sample, and optionally an additive. In many embodiments, the milk sample is acquired from breast milk or baby formula. In many embodiments, the skin sample is acquired from a healthy skin area of a subject.

The personalized skin care compositions in accordance with the present disclosure may be prepared by any of the methods discussed herein. In some embodiments, the personalized skin care composition may be prepared according to a method comprising (i) acquiring the milk sample from breast milk or baby formula, (ii) acquiring the skin sample from a healthy skin area of a subject, (iii) mixing the milk sample and the skin sample, and (iv) culturing the milk sample and the skin sample to yield the personalized skin care composition.

In many embodiments, the method of making a personalized skin care composition further comprises adding an additive. The additive may be added at any step of the method. In some embodiments, the additive is added after culturing the milk sample and the skin sample to yield the personalized skin care composition.

In some preferred embodiments, the personalized skin care composition comprises a cultured composition comprising a milk sample acquired from breast milk of a human mother, and a skin sample acquired from a healthy skin area of the mother's child. In some preferred embodiments, the child is a breastfed child and/or the child's diet is comprised primarily of the mother's breast milk. In some preferred embodiments, the child is a human infant.

Milk Sample

Generally, the milk sample in accordance with the present disclosure may be any milk sample known in the art. The milk sample may be a natural milk sample acquired from a natural source or a synthetic milk sample acquired from a synthetic source. Natural milk samples may be expressed from a subject. Synthetic milk samples may be acquired from synthetic breast milk or baby formula.

In some preferred embodiments, the milk sample is acquired from a natural source, such as the breast milk of a mammalian subject (e.g., a human mom). Acquiring the milk sample may comprise manually expressing the breast milk from the mammalian subject. Manual expression may include any means of manual expression known in the art, including manual expression by hand.

Acquiring the milk sample may also, or alternatively, comprise expressing the breast milk using a breast pump, such as the sterile breast pump provided in the kits described herein.

Alternatively, the milk sample may be acquired from a synthetic source, such as baby formula. Baby formula as used herein refers to any synthetic or manufactured breast milk substitute designed for feeding babies or infants. Many different baby formulas are well known in the art and commercially available, any of which may be used in accordance with the present disclosure as desired.

In some embodiments, the baby formula comprises human milk oligosaccharides (HMOs). HMOs are polymers of simple sugars that are naturally occurring in human breast milk. HMOs may promote the colonization of intestinal microbes, such as the ones that are increased on the diapered skin of non-rash infants. Therefore, if the milk sample is to be acquired from baby formula, using a baby formula comprising HMOs may be advantageous and may improve the efficacy of the kits, methods, and compositions described herein. Non-limiting examples of suitable HMOs include 2'-fucosyllactose, lacto-N-tetraose, 2'-sialyllactose, lacto-N-neotetraose, lacto-N-fucopentaose, and combinations thereof. In some preferred embodiments, the HMOs are selected from the group consisting of 2'-fucosyllactose, lacto-N-tetraose, and 2'-sialyllactose.

The baby formula may also comprise prebiotics or probiotics. As used herein, prebiotics refer to indigestible food ingredients that induce growth or activity of beneficial microorganisms, often in the gastrointestinal tract. Probiotics as used herein refer to living microorganisms or components of microorganisms that confer a beneficial effect on a subject when consumed. Prebiotics or probiotics administered through infant formula may be used to promote microbial health both in the gastrointestinal tract and on the skin. Non-limiting examples of probiotics include any species of *Lactobacillus* or *Bifidobacterium*. Non-limiting examples of prebiotics include oligosaccharides, such as fructooligosaccharides or galactooligosaccharides, polydextrose, and combinations thereof.

The amount of milk sample acquired will depend on the desired amount of the personalized skin care composition resulting therefrom. Therefore, the milk sample may be acquired in any range of suitable amounts. Amounts are defined herein in milliliters (mL). In some embodiments, the milk sample is acquired in an amount from about 10 mL, about 20 mL, about 30 mL, about 40 mL, about 50 mL, about 60 mL, about 70 mL, about 80 mL, about 90 mL, about 100 mL, about 110 mL, about 120 mL, about 130 mL, about 140 mL, about 150 mL, about 160 mL, about 170 mL, about 180 mL, about 190 mL, about 200 mL, about 210 mL, about 220 mL, about 230 mL, about 240 mL, about 250 mL, about 260 mL, about 270 mL, about 280 mL, about 290 mL, or more than about 300 mL, to about 10 mL, about 20 mL, about 30 mL, about 40 mL, about 50 mL, about 60 mL, about 70 mL, about 80 mL, about 90 mL, about 100 mL, about 110 mL, about 120 mL, about 130 mL, about 140 mL, about 150 mL, about 160 mL, about 170 mL, about 180 mL, about 190 mL, about 200 mL, about 210 mL, about 220 mL, about 230 mL, about 240 mL, about 250 mL, about 260 mL, about 270 mL, about 280 mL, about 290 mL, or more than about 300 mL. In some preferred embodiments, the milk sample is acquired in an amount from about 10 mL to about 25 mL.

Skin Sample

Generally, the skin sample in accordance with the present disclosure may be any skin sample known in the art. Similarly, the skin sample in accordance with the present disclosure may be acquired by any known method of acquiring skin samples known in the art.

In many embodiments, the skin area from which the skin sample is acquired is a healthy skin area of a subject. A healthy skin area as used herein is any skin area that appears normal and does not exhibit, for example, significant brokenness, irritation, erythema, swelling, rash, or other signs of distress or disease. The healthy skin area should not include a skin area presently affected by a skin condition, examples of which are described herein. However, the healthy skin area may have been previously affected by a skin condition.

In some preferred embodiments, the healthy skin area is a perianal skin area. In some preferred embodiments, the healthy skin area is a perianal skin area of a human infant. In some preferred embodiments, the healthy skin area is a buttock skin area of a human infant.

In some embodiments, the skin area in need thereof is a skin area presently experiencing a skin condition as described herein. In some embodiments, the skin area in need thereof is a skin area that has previously experienced a skin condition, but is presently healthy. In some embodiments, the skin area in need thereof is a skin area that is presently healthy and has not previously experienced a skin condition.

Generally, the skin sample may be acquired by any method of acquiring a skin sample typically used in a clinical or laboratory setting or otherwise known in the art. For example, the skin sample may be acquired by scraping a sterile implement against the healthy skin area. In some embodiments, acquiring the skin sample may comprise gently rubbing or otherwise contacting a sterile implement against the healthy skin area of the subject. The acquired skin sample may be used immediately, or stored in a sterile container for future use, as desired.

There are no particular limitations as to the amount of skin sample comprised in the personalized skin care composition resulting therefrom. As discussed herein, the skin sample provides microorganisms from the healthy skin area of the subject to the personalized skin composition. Because the skin sample is cultured, resulting in proliferation of the provided microorganisms, the skin sample need only provide an amount of microorganisms sufficient to proliferate to appreciable levels upon culturing. Therefore, the skin sample may be acquired in any range of suitable amounts. Generally, bacteria are discussed in log numbers. In some embodiments, the skin sample is acquired in an amount of from about 0-10 CFU/mL, about 11-100 CFU/mL, about 101-1000 CFU/mL, about 1001-10000 CFU/mL, about 10,001-100,000 CFU/mL, or about 100,001-1,000,000 CFU/mL to about 11-100 CFU/mL, about 101-1000 CFU/mL, about 1001-10000 CFU/mL, about 10,001-100,000 CFU/mL, or about 100,001-1,000,000 CFU/mL. In some embodiments, the skin sample is acquired in an amount of about 0-10 CFU/mL, about 11-100 CFU/mL, about 101-1000 CFU/mL, about 1001-10000 CFU/mL, about 10,001-100,000 CFU/mL, or about 100,001-1,000,000 CFU/mL.

In some embodiments, the skin sample is acquired from the subject after the subject has ingested breast milk or baby formula from the source from which the milk sample is acquired. In these embodiments, the subject ingests a first amount of breast milk or baby formula from a source of the breast milk or baby formula, and then a second amount of the breast milk or baby formula from the source of the breast milk or baby formula is mixed with a skin sample that is acquired from the subject after the subject has ingested the first amount of the breast milk or baby formula, and the mixture is cultured to yield the personalized skin care composition.

In some preferred embodiments, a regular diet of the subject comprises the breast milk or baby formula from which the milk sample is acquired. In some preferred embodiments, the skin sample is acquired from a human child or infant that regularly consumes breast milk from which the milk sample is acquired. As discussed herein, the intestinal microbiome, which may transiently colonize the skin, as well as the endemic skin microbiome, are affected by diet. Therefore, the personalized skin care composition of the present disclosure is expected to at least in part mimic the healthy skin microbiome of the subject.

There are no limitations as to the ratio of milk sample to skin sample in the personalized skin care composition of the present disclosure. Generally, the amount of the milk sample is greater than the amount of the skin sample in the personalized skin care composition. For example, a ratio of milk sample to skin sample may be used such that the volume of the milk sample is sufficient to submerge the skin sample and/or a sterile implement used to acquire the skin sample.

In some embodiments, the milk sample and skin sample are present in the personalized skin care composition in a ratio in the range of from about 1000:1 to 1:1000 by wt %. In some embodiments, the milk sample and skin sample are present in the personalized skin care composition in a ratio in the range of from about 100:1 to 1:100 by wt %. In some embodiments, the milk sample and skin sample are present in the personalized skin care composition in a ratio in the range of from about 10:1 to 1:10 by wt %.

Subjects

In many embodiments, the subject is an animal subject, a human subject, or a non-human animal subject. The subject may be any age or gender. Non-limiting examples include male infants, female infants, male toddlers, female toddlers, male children, female children, male adults, female adults, elderly males, and elderly females. In some embodiments, the subject is a human subject.

In some embodiments, the subject is a human child. In some preferred embodiments, the subject is a human infant.

Culturing

The cultured composition comprised in the personalized skin care composition may be obtained by any of the culturing methods as discussed herein. Generally, the culturing in accordance with the present disclosure may be any culturing method known in the art. Culturing as used herein generally refers to maintaining the cultured composition comprising the milk and skin sample under any conditions that allow for the growth of microorganisms. The cultured composition comprising the milk and skin sample may be cultured at any range of suitable temperatures. Temperatures are defined herein in degrees Celsius (° C.).

In some embodiments, the cultured composition comprising the milk sample and skin sample is cultured at a temperature of from about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° ° C., or about 50° C., to about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° ° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° ° C., about 49° ° C., or about 50° C.

In some preferred embodiments, the cultured composition comprising the milk sample and skin sample is cultured at a temperature of from about 15° C. to about 30° C.

The cultured composition comprising the milk sample and skin sample may be cultured for any range of suitable durations. In some embodiments, the cultured composition comprising the milk and skin sample are cultured for a duration of about 24 hours, about 48 hours, about 72 hours, about 96 hours, about 120 hours, about 144 hours, about 168 hours, about 192 hours, about 216 hours, about 240 hours, about 264 hours, about 288 hours, about 312 hours, about 336 hours, about 360 hours, about 384 hours, about 408 hours, about 432 hours, about 456 hours, about 480 hours, or about 504 hours, to about 24 hours, about 48 hours, about 72 hours, about 96 hours, about 120 hours, about 144 hours, about 168 hours, about 192 hours, about 216 hours, about 240 hours, about 264 hours, about 288 hours, about 312 hours, about 336 hours, about 360 hours, about 384 hours, about 408 hours, about 432 hours, about 456 hours, about 480 hours, about 504 hours, or more than about 504 hours.

In some embodiments, the cultured composition comprising the milk and skin sample is cultured for a duration of from about 1 week, about 2 weeks, about 3 weeks, or more than about 4 weeks, to about 1 week, about 2 weeks, about 3 weeks, or more than about 4 weeks. In some preferred embodiments, the cultured composition comprising the milk and skin sample is cultured for a duration of from about 1 week to about 2 weeks.

Culturing the milk sample and the skin sample may allow beneficial microorganisms present in the milk sample or the skin sample to proliferate. Therefore, culturing the milk sample and the skin sample may result in beneficial microorganisms being present in the personalized skin care composition. In some preferred embodiments, culturing a milk sample from breast milk of a human mother and a skin sample from a breastfed child of the mother provides a personalized skin composition comprising beneficial microorganisms endemic to the mother's breast milk, the child's skin, and/or the child's gastrointestinal tract. For example, culturing the milk sample and the skin sample may provide any beneficial microorganism, such as those belonging to the genera including *Bacterioides, Balutia, Bifidobacterium, Brevundimonas, Burkholderia, Chryseobacterium, Clostridium, Corynebacterium, Enhydrobacter, Enterobacter, Enterococcus, Escherichia, Faecalibacterium, Flavobacterium, Lactobacillus, Leuconostoc, Micrococcus, Parabacteroides, Prevotella, Propionibacterium, Propionibacterium, Ralstonia, Rothia, Serratia, Sphingomonas, Staphylococcus, Stenotrophomonas, Streptococcus, Variovorax, Weissella*, and combinations thereof.

Non-limiting examples of specific beneficial microorganisms that may be provided in the personalized skin care composition include *Faecalibacterium prausnitzii, Bacteroides caccai, Bacteroides fragilis, Bacteroides stercoris, Bacteroides xylanisolvens, Parabacteroides distansonis, Prevotella copri, Bifidobacterium longum, Bifidobacterium breve, Bifidobacterium bifidum, Bifidobacterium adolescentis, Lactobacillus fermentum, Lactobacillus rhamnosus, Lactobacillus plantarum, Lactobacillus casei, Lactobacillus paracasei*, and combinations thereof. These microorganisms are associated with healthy skin and the post-diaper rash recovered state.

In some embodiments, culturing the milk sample and the skin sample forms a biofilm in addition to a liquid component, both of which comprise the resulting personalized skin care composition. A biofilm is a solid film or gel-like substance that generally comprises multiple communal species of microorganisms. In some embodiments, the biofilm is a symbiotic culture of bacteria and yeast, commonly known as a "SCOB" or "SCOBY". The bacteria can be, for example, lactic acid bacteria or acetic acid bacteria, such as Bifidobacterium and Lactobacillus. The bacteria may also be present in the liquid component. Without being bound by theory, the personalized skin care composition comprising the liquid component and/or biofilm is expected to provide beneficial properties upon application to the skin, due to the growth of lactic and acetic acid bacteria and the resulting lowering in skin pH. The lower pH provides antimicrobial properties which are effective against pathogens such as Group B *Streptococcus* and diaper rash-related organisms such as *Staphylococcus aureus* and *Candida albicans*.

Additives

The personalized skin care compositions described herein may include additives. The additives as discussed herein may be added at any point before, after, or during culturing, as desired.

The personalized skin care compositions described herein may include any additive conventionally found in cosmetic, pharmaceutical, medical, or personal care compositions/products in an established fashion and at established levels. For example, the personalized skin care composition may comprise additional compatible pharmaceutically active and compatible materials for combination therapy, such as antioxidants, anti-parasitic agents, antipruritics, antifungals, biological actives, astringents, keratolytic actives, local anaesthetics, anti-stinging agents, anti-reddening agents, skin soothing agents, external analgesics, film formers, skin exfoliating agents, sunscreens, and combinations thereof.

Other suitable additives that may be included in the personalized skin care composition of the present disclosure include compatible colorants, deodorants, emulsifiers, anti-foaming agents (when foam is not desired), lubricants, skin conditioning agents, skin protectants and skin benefit agents (e.g., aloe vera and tocopheryl acetate), solvents, solubilizing agents, suspending agents, wetting agents, pH adjusting ingredients, chelators, propellants, dyes and/or pigments, and combinations thereof.

Another component that may be suitable for addition to the personalized skin care composition is a fragrance. Any compatible fragrance may be used. Typically, the fragrance is present in an amount from about 0% (by weight of the composition) to about 5% (by weight of the composition), and more typically from about 0.01% (by weight of the composition) to about 3% (by weight of the composition). In one desirable embodiment, the fragrance will have a clean, fresh and/or neutral scent to create an appealing delivery vehicle for the end consumer.

Organic sunscreens that may be present in the personalized skin care compositionsinclude ethylhexyl methoxycinnamate, avobenzone, octocrylene, benzophenone-4, phenylbenzimidazole sulfonic acid, homosalate, oxybenzone, benzophenone-3, ethylhexyl salicylate, and mixtures thereof.

The personalized skin care compositions described herein may also or alternatively include any additive conventionally found in cultured compositions. Non-limiting examples of additives that may be present in the personalized skin care composition include sugars, fatty acids, vitamins, minerals, serums, nucleotides, salts, buffers, water, agar, gelatin, dyes, enzymes, proteins, antifungals, and mixtures thereof.

In some embodiments, the personalized skin care compositions described herein do not comprise an additive. The personalized skin care compositions may not comprise an additive if, for example, it is desired that the personalized skin care compositions only include the endemic microbiomes of the milk sample and the skin sample. In some embodiments, the personalized skin care compositions consist of a milk sample and a skin sample. In some embodiments, the personalized skin care compositions consist of a breast milk sample acquired from a human mother and a skin sample acquired from a breastfed human child.

Kits

Also provided are kits for making the personalized skin care compositions described herein. Generally, the kits for making a personalized skin care composition in accordance with the present disclosure comprise a sterile implement, a sterile collection vial, a sterile hydrophobic container, and written instructions for making the personalized skin care composition. In many embodiments, the sterile hydrophobic container comprises etching for biofilm formation, a lid, and a filter allowing for gas exchange.

In many embodiments, the written instructions comprise the method steps of acquiring a milk sample from breast milk or baby formula using the sterile collection vial, acquiring a skin sample from a healthy skin area of a subject using the sterile implement, transferring the milk sample to the sterile, hydrophobic container and mixing the milk sample and the skin sample, and culturing the milk sample and the skin sample to yield the personalized skin care composition.

In many embodiments, the written instructions for the kit for making a personalized skin care composition further comprises a method step of adding an additive. The additive may be added at any step of the instructions. In some embodiments, the written instructions further comprise a method step of adding an additive after the method step of culturing the milk sample and the skin sample to yield the personalized skin care composition. In embodiments where the written instructions for the kit for making a personalized skin care composition further comprises a method step of adding an additive, the kit optionally comprises the additive.

In some embodiments, the kit may further comprise a breast pump. A breast pump as used herein refers to any mechanical device designed to pump or extract breast milk. The breast pump may comprise, for example, a pump, breast shields or flanges, valves, membranes, tubing, connectors, or backflow protectors. Many different breast pumps are well known in the art and commercially available, any of which may be used in accordance with the present disclosure as desired.

In many embodiments, it may be desirable to sanitize and/or sterilize the breast pump and/or components of the breast pump prior to acquiring the milk sample. The breast pump or its components discussed herein may be sanitized and/or sterilized by any method known in the art, non-limiting examples of which include boiling, microwaving, washing with soap and water, ultraviolet (UV) radiation, applying a chemical sanitizer, or steam cleaning. Similarly, if the milk sample is to be acquired by manually expressing breast milk, it may be desirable to sanitize and/or sterilize hands, typically by washing with soap and water and/or applying a chemical sanitizer, prior to acquiring the milk sample.

In some embodiments, the written instructions comprise a method step of acquiring a milk sample from breast milk using the breast pump and the sterile collection vial.

Generally, the kits described herein are suitable for use in the methods as discussed in the present disclosure. In some embodiments, the kits may be used in the methods of making a personalized skin care composition in accordance with the present disclosure. In some embodiments, the kits may be used in the methods of preventing or treating skin conditions in accordance with the present disclosure.

Figure 1:
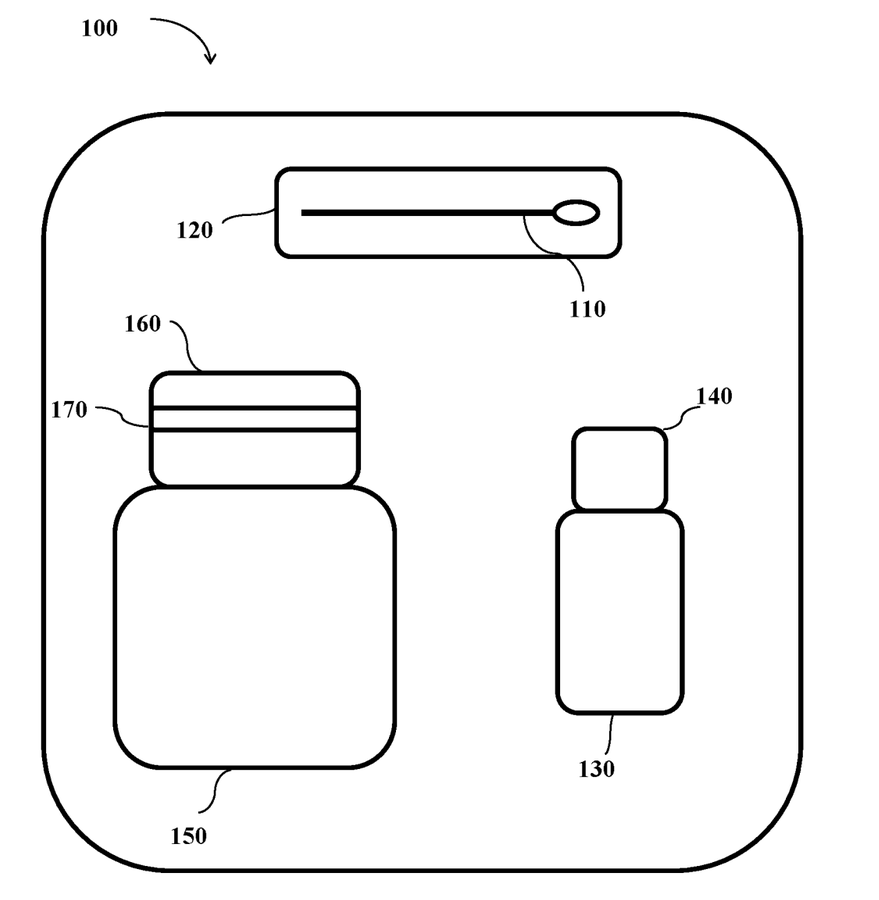
FIG. 1 is an exemplary embodiment of a kit containing a sterile, hydrophobic container, a sterile collection vial, and a sterile implement in accordance with the present disclosure.

FIG. 1 is a schematic of an exemplary kit 100 for making the personalized skin care compositions in accordance with the present disclosure. The exemplary kit includes a sterile collection vial 130 comprising a lid 140 for acquiring the milk sample. The exemplary kit 100 also includes a sterile swab 110 provided in a sterile container 120 for acquiring the skin sample. A sterile, hydrophobic container 150 comprising a lid 160 and filter 170 is also provided in the exemplary kit 100. A set of written instructions (not shown) detailing how to use the components of the exemplary kit 100 are also included. The kit components shown in FIG. 1 are provided for illustrative purposes only and are not drawn to scale.

In many embodiments, a milk sample is acquired using the sterile collection vial provided in the kit in accordance with the present disclosure. Sterile, as used herein, generally refers to being free from bacteria or other living microorganisms. Sterile kit components as described herein limit introduction of contaminating microorganisms, e.g. microorganisms that are not naturally present in the milk sample or the skin sample, into the personalized skin care composition. If the milk sample is to be acquired from breast milk, the breast milk may be manually expressed directly into the sterile collection vial: alternatively, the sterile collection vial may be operatively connected to the breast pump such that the breast milk is directly extracted into the sterile collection vial. If the milk sample is to be acquired from baby formula, the baby formula may be prepared in or transferred into the sterile collection vial.

There are no limitations as to the size or shape of the sterile collection vial. Any sterile collection vial that is suitable for holding or otherwise containing the milk sample acquired from breast milk or baby formula may be used. For example, the sterile, collection vial may be a dish, a flask, a beaker, a bag, a bottle, a jar, a plate, a tube, or any other type of container known in the art. In some embodiments, the sterile collection vial may comprise a lid configured to secure the contents of the sterile collection vial. The milk sample may be used immediately in the methods of the present disclosure or stored in the sterile collection vial for future use. It may be desirable to freeze the milk sample for long-term storage, and thaw the milk sample for use in the methods of the present disclosure.

As discussed herein, acquiring a skin sample from a healthy skin area acquires microorganisms associated with healthy skin for use in the personalized skin care composition of the present disclosure. In many embodiments, the skin sample is acquired using the sterile implement provided in the kits of the present disclosure. There are no limitations as to the type of sterile implement that may be used to collect the skin sample, provided the sterile implement is capable of acquiring microorganisms from the skin without substantially damaging the skin. The sterile implement may be, for example, a sterile dry swab, a sterile sponge, a sterile loop, or a sterile tape strip. In some preferred embodiments, the sterile implement is a sterile dry swab. In some embodiments, the sterile implement may be provided in a sterile container.

In many embodiments, the milk sample is transferred to a sterile, hydrophobic container provided in the kit in accordance with the present disclosure and mixed with the skin sample. Mixing the milk sample and skin sample in accordance with the present disclosure may include any means of combining or otherwise contacting the milk sample and skin sample. For example, the milk sample may be stirred or touched by a portion of the sterile implement used to acquire the skin sample. In some embodiments, the entire sterile implement used to acquire the skin sample may be placed into the milk sample.

Upon mixing the milk sample and skin sample, the combined milk sample and skin sample are cultured according to any of the culturing methods discussed herein in the provided sterile, hydrophobic container. There are no limitations as to the particular size or shape of the sterile, hydrophobic container, provided the sterile, hydrophobic container has a suitable size and shape for containing the milk sample and skin sample. For example, the sterile, hydrophobic container may be a dish, a flask, a beaker, a bag, a box, a bottle, a jar, a plate, a tube, or any other type of container known in the art. The sterile, hydrophobic container may be comprised of any hydrophobic material known in the art to be suitable in the culturing methods as discussed herein. Non-limiting examples of suitable hydrophobic materials include polystyrene, polyethylene terephthalate, low-density or high-density polyethylene, polyvinyl chloride, polypropylene, fluoropolymers, and combinations thereof.

In many embodiments, the provided sterile, hydrophobic container comprises etching, a lid, and a filter. Etching as used herein refers to an abraded or otherwise textured surface comprised in the sterile, hydrophobic container. The etching may be comprised on any and/or all surfaces of the sterile, hydrophobic container. It is well known that the texture of a surface influences adherence of microorganisms and the resulting formation of biofilms. Therefore, the etching comprised in the provided sterile, hydrophobic container is designed to encourage the formation of biofilms for use in the methods of the present disclosure. Etching may be achieved by any means known in the art to induce surface abrasion or texturing, including physical abrasion methods, such as grit-blasting or sand-blasting, or chemical abrasion methods, such as acid etching. The etching may be comprised in any pattern or otherwise regular, repeated design, or the etching may be comprised in a random configuration, as desired.

There are no limitations as to the provided lid and filter comprised in the sterile, hydrophobic container, provided that the lid is configured to securely close the sterile, hydrophobic container and the filter is configured to allow for gas exchange between atmospheric air and the interior of the sterile, hydrophobic container. For example, the filter may be configured to allow for the exchange of oxygen ($O_2$), carbon dioxide ($CO_2$), nitrogen ($N_2$), water vapor, and mixtures thereof between atmospheric air and the interior of the sterile, hydrophobic container. In some embodiments, the filter is configured to prevent entry of any component other than a gas into the interior of the sterile, hydrophobic container. For example, the filter may be configured to prevent the entry of microorganisms, spores, dust, debris, particulates, or any other component of air that is not a gas into the interior of the sterile hydrophobic container. In some embodiments, the filter is comprised in the lid. The filter may be comprised of any material known in the art to be suitable for use as a filter, including polypropylene, cellulose, cellulose esters, fiberglass, nylon, acrylic, polytetrafluoroethylene, polyvinylidene fluoride, polyethersulfone, and combinations thereof.

In some embodiments, the kit comprises any of the additives described herein for use in the personalized skin care composition.

In some embodiments, a first personalized skin care composition yielded by culturing the milk sample and the skin sample may be used to make at least one additional personalized skin care composition, as desired.

In some embodiments, the kits described herein comprise at least one additional sterile, hydrophobic container for use in making additional personalized skin care compositions. In some embodiments, a separate kit is provided comprising at least one additional sterile, hydrophobic container for use in making additional personalized skin care compositions. In some embodiments, the first hydrophobic container used to make the first personalized skin care composition is cleaned and sterilized by any of the means discussed herein, and used to make the at least one additional personalized skin care composition.

Making an additional personalized skin care composition may comprise transferring a portion of the first personalized skin care composition to the provided additional sterile, hydrophobic container. In some embodiments, the portion of the first personalized skin care composition comprises a biofilm and a liquid component. An additional milk sample may then be acquired and transferred to the additional sterile, hydrophobic container. The additional sterile, hydrophobic container containing the portion of the first personalized skin care composition and the additional milk sample may then be cultured to yield an additional personalized skin care composition. This process may be repeated as desired in accordance with the kits and/or methods discussed herein.

Methods

Provided herein are methods of making a personalized skin care composition. The methods of making a personalized skin care composition in accordance with the present disclosure generally comprise (i) acquiring a milk sample, (ii) acquiring a skin sample, (iii) mixing the milk sample and the skin sample, and (iv) culturing the milk sample and the skin sample to yield the personalized skin care composition. The milk sample, skin sample, and culturing thereof are as discussed herein in accordance with the present disclosure.

In many embodiments, the method of making a personalized skin care composition further comprises adding an additive. The additive may be added at any step of the method. In some embodiments, the additive is added after culturing the milk sample and the skin sample to yield the personalized skin care composition.

Also provided are methods of treating or preventing a skin condition in a skin area in need thereof. The methods of treating or preventing a skin condition in accordance with the present disclosure generally comprise (i) acquiring a milk sample, (ii) acquiring a skin sample, (iii) mixing the milk sample and the skin sample, (iv) culturing the milk sample and the skin sample to yield the personalized skin care composition, and (v) applying an effective amount of the personalized skin care composition to the skin area in need thereof of the subject. The milk sample, skin sample, and culturing thereof are as discussed herein in accordance with the present disclosure.

In many embodiments, the method of treating or preventing a skin condition in a skin area in need thereof further comprises adding an additive. The additive may be added at any step of the method. In some embodiments, the additive is added after culturing the milk sample and the skin sample to yield the personalized skin care composition.

Also provided are methods of using a personalized skin care composition. The methods of using a personalized skin care composition in accordance with the present disclosure generally comprise using the personalized skin care composition to treat or prevent a skin condition.

Also provided are uses of a personalized skin care composition. The use of a personalized skin care composition in accordance with the present disclosure generally comprises using the personalized skin care composition to treat or prevent a skin condition.

An effective amount of the personalized skin care composition as used herein generally refers to an amount of the personalized skin care composition that is sufficient to achieve a desired result. To the extent that the personalized skin care composition is used to treat a skin condition, the desired result may be a reduction or mitigation of any of the symptoms or causes of the skin condition. For example, the result may be a reduction in redness, swelling, irritation, discomfort, abnormal appearance, roughness, bumpiness, dryness, or scaliness of the skin area to which the personalized skin care composition is applied. To the extent that the personalized skin care composition is used to prevent a skin condition, the desired result may be preventing or substantially delaying the appearance of any of the symptoms or causes of the skin condition described herein.

In some embodiments, applying an effective amount of the personalized skin care composition comprises topically applying a liquid component of the personalized skin care composition to the skin area in need thereof. The liquid component may be applied in any range of suitable amounts.

In some embodiments, the liquid component of the personalized skin care composition is applied in an amount of from about 0.10 mL, about 0.50 mL, about 1.0 mL, about 1.5 mL, about 2.0 mL, about 2.5 mL, about 3.0 mL, about 3.5 mL, about 4.0 mL, about 4.5 mL, about 5.0 mL, about 5.5 mL, about 6.0 mL, about 6.5 mL, about 7.0 mL, about 7.5 mL, about 8.0 mL, about 8.5 mL, about 9.0 mL, about 9.5 mL, or about 10.0 mL, to about 0.10 mL, about 0.50 mL, about 1.0 mL, about 1.5 mL, about 2.0 mL, about 2.5 mL, about 3.0 mL, about 3.5 mL, about 4.0 mL, about 4.5 mL, about 5.0 mL, about 5.5 mL, about 6.0 mL, about 6.5 mL, about 7.0 mL, about 7.5 mL, about 8.0 mL, about 8.5 mL, about 9.0 mL, about 9.5 mL, about 10.0 mL, or more than about 10.0 mL.

The liquid component of the personalized skin composition may be applied to a skin area in need thereof by any suitable means known in the art. For example, it may be desired to apply the liquid component of the personalized skin care composition such that the skin area in need thereof is sufficiently covered by the liquid. In some embodiments, the liquid component may first be applied to a wipe which is then applied to the skin area in need thereof.

In some embodiments, applying an effective amount of the personalized skin care composition comprises topically applying a biofilm component of the personalized skin care composition to the skin area in need thereof. The biofilm component of the personalized skin care composition may be applied to a skin area in need thereof by any suitable means known in the art. For example, it may be desired to apply the biofilm component of the personalized skin care composition such that the skin area in need thereof is sufficiently covered by the biofilm.

The methods described herein are suitable for treating or preventing any number of skin conditions. Non-limiting examples of skin conditions in accordance with the present disclosure include diaper rash, rash, dermatitis, rosacea, eczema, psoriasis, hives, acne, cold sores, blisters, carbuncles, cellulitis, and combinations thereof.

In some preferred embodiments, the skin condition is diaper rash. In some preferred embodiments, the skin condition is a skin condition known to be affected by diet.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Example 1. Exemplary Kit

An exemplary kit for making a personalized skin care composition may include the following components.
1: Sterile, 12 oz. hydrophobic container(s) comprising etching for biofilm formation and a lid with filter to allow for gas exchange
2: Tubed, sterile Dryswab (MWE medical wire, Corsham Wiltshire England, Tubed Sterile Dryswab, rayon, ref. MW102).
3: Sterile, electric breast pump and collection vial.

Example 2. Breast Milk Sample Collection

Prior to collection, breast and hands should be cleaned with antibacterial soap and warm water. Electric breast pump, parts, and collection vial should be sanitized prior to collection. If breast milk is manually expressed, hands should also be properly sanitized.

Approximately 120 mL (4 oz.) of breast milk are expressed into the sterile collection vial, and a cover is placed onto the vial for storage.

Example 3. Infant Endemic/Transient Skin Microbiome Collection

The infant should be healthy and happy with no signs of fever, distress (such as teething), rash, vomiting, or diarrhea.

At the time of diaper change and before cleaning baby's bottom, skin near the rectum is swabbed back and forth for 30 seconds. If baby has a bowel movement, as much of the stool as possible should be removed from the buttocks with the used diaper prior to swabbing.

The swab is returned to the tube and closed.

Example 4. Biofilm and Personalized Skin Care Composition Creation

The breast milk is expressed and transferred to a sterile, hydrophobic container.

The swab is removed from the collection tube and placed in the transferred breast milk.

The lid is returned to the sterile, hydrophobic container, with a filter to allow gas exchange but prevent contamination.

The container is placed in a warm area and the culture is allowed to grow for 1 to 2 weeks. A liquid end product and a biofilm are formed.

Example 5. Use of the Personalized Skin Care Composition to Treat or Prevent Diaper Rash The liquid end product of the personalized skin care composition can be directly applied on infant's diapered region as a rinse or applied using a wipe to prevent rash or during a rash episode.

For more severe diaper rash, a layer of the biofilm can be peeled horizontally and used as a film in the baby's diaper by covering the rashed area. The remaining layers can also be used or reserved for future batches.

Example 6. Personalized Skin Care Composition Creation for Future Rash Episodes

Approximately 0.5 to 1.0 oz. of the personalized skin care composition, including the biofilm, is reserved from the previous container and transferred to new sterile, hydrophobic container.

Approximately 120 ml (4 oz.) of breast milk is expressed (provided baby is not currently experiencing diaper rash) and transferred to the sterile, hydrophobic container containing the biofilm and the first liquid end product of the personalized skin care composition.

The culture is allowed to sit for 1 to 2 weeks in a warm place.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause: other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A personalized skin care composition comprising:
   a cultured composition comprising:
      a milk sample acquired from breast milk or baby formula; and
      a skin sample acquired from a healthy skin area of a subject; and
   optionally an additive.

2. The personalized skin care composition of claim 1, wherein the cultured composition is cultured for an amount of time greater than about 24 hours.

3. The personalized skin care composition of claim 1, wherein the cultured composition is cultured at a temperature greater than about 18° C. and less than about 30° C.

4. The personalized skin care composition of claim 1, wherein the subject is a child.

5. The personalized skin care composition of claim 1, wherein the baby formula comprises a component selected from the group consisting of human milk oligosaccharides, prebiotics, probiotics, and combinations thereof.

6. A kit for making a personalized skin care composition, the kit comprising:
   a sterile implement;
   a sterile collection vial;
   a sterile, hydrophobic container comprising etching for biofilm formation, a lid, and a filter allowing for gas exchange;

optionally a breast pump; and written instructions for making the personalized skin care composition, comprising the method steps of:
- i. acquiring a milk sample from breast milk or baby formula using the sterile collection vial and optionally the breast pump;
- ii. acquiring a skin sample from a healthy skin area of a subject using the sterile implement;
- iii. transferring the milk sample to the sterile, hydrophobic container and mixing the milk sample and the skin sample; and
- iv. culturing the milk sample and the skin sample to yield the personalized skin care composition.

7. The kit of claim 6, wherein the method step of culturing the milk sample and the skin sample forms a biofilm.

8. The kit of claim 6, wherein the method step of culturing the milk sample and the skin sample is carried out at a temperature greater than about 18° C. and less than about 30° C.

9. The kit of claim 6, wherein the method step of culturing the milk sample and skin sample is carried out for an amount of time greater than about 24 hours.

10. The kit of claim 6, wherein the subject is a child.

11. A method of making a personalized skin care composition, the method comprising:

acquiring a milk sample from breast milk or baby formula;

acquiring a skin sample from a healthy skin area of a subject;

mixing the milk sample and the skin sample; and culturing the milk sample and the skin sample to yield the personalized skin care composition.

12. The method of claim 11, wherein the method step of culturing the milk sample and the skin sample comprises forming a biofilm.

13. The method of claim 11, wherein the method step of culturing the milk sample and the skin sample is carried out at a temperature greater than about 18° C. and less than about 30° C.

14. The method of claim 11, wherein the method step of culturing the milk sample and skin sample is carried out for an amount of time greater than about 24 hours.

15. The method of claim 11, wherein the subject is a child.

16. A method of treating or preventing a skin condition in a skin area in need thereof, the method comprising:

acquiring a milk sample from breast milk or baby formula;

acquiring a skin sample from a healthy skin area of a subject;

mixing the milk sample with the skin sample;

culturing the milk sample and skin sample to yield a personalized skin care composition; and applying an effective amount of the personalized skin care composition to the skin area in need thereof of the subject.

17. The method of claim 16, wherein the method step of culturing the milk sample and the skin sample comprises forming a biofilm.

18. The method of claim 17, further comprising a step of applying the biofilm to the skin area in need thereof.

19. The method of claim 16, wherein the skin condition is diaper rash.

20. The method of claim 16, wherein the healthy skin area is a perianal skin area.

* * * * *